United States Patent
Huang et al.

(10) Patent No.: US 12,238,230 B2
(45) Date of Patent: Feb. 25, 2025

(54) BLOCKCHAIN CONSENSUS METHOD, APPARATUS, AND DEVICE, AND STORAGE MEDIUM

(71) Applicant: CHINA UNIONPAY CO., LTD., Shanghai (CN)

(72) Inventors: Yan Huang, Shanghai (CN); Qinglin Hu, Shanghai (CN); Yu Zhou, Shanghai (CN); Weihuai Liu, Shanghai (CN); Jingxiu Hu, Shanghai (CN); Xu Le, Shanghai (CN); Yuzhuang Xu, Shanghai (CN); Hehe Wang, Shanghai (CN); Zhaoye Xu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/575,811

(22) PCT Filed: Aug. 4, 2022

(86) PCT No.: PCT/CN2022/110336
§ 371 (c)(1),
(2) Date: Dec. 29, 2023

(87) PCT Pub. No.: WO2023/071373
PCT Pub. Date: May 4, 2023

(65) Prior Publication Data
US 2024/0163121 A1 May 16, 2024

(30) Foreign Application Priority Data
Oct. 30, 2021 (CN) .......................... 202111277507.8

(51) Int. Cl.
*H04L 9/00* (2022.01)
*H04L 9/06* (2006.01)

(52) U.S. Cl.
CPC . *H04L 9/50* (2022.05); *H04L 9/06* (2013.01)

(58) Field of Classification Search
CPC . H04L 9/50; H04L 9/06; H04L 9/3297; H04L 9/3239; G06F 16/27
See application file for complete search history.

(56) References Cited

U.S. PATENT DOCUMENTS

| | | | | |
|---|---|---|---|---|
| 11,239,999 | B1* | 2/2022 | Winarski | H04L 9/12 |
| 2020/0252221 | A1 | 8/2020 | Zamani et al. | |
| 2022/0374229 | A1* | 11/2022 | Angelo | G06F 8/70 |

FOREIGN PATENT DOCUMENTS

| | | | |
|---|---|---|---|
| CN | 108765151 A | * | 11/2018 |
| CN | 109417483 A | | 3/2019 |

(Continued)

OTHER PUBLICATIONS

The World Intellectual Property Organization (WIPO) International Search Report for PCT/CN2022/110336 Oct. 25, 2022 5 pages ( including translation).

(Continued)

*Primary Examiner* — Kevin Ayala
(74) *Attorney, Agent, or Firm* — ANOVA LAW GROUP, PLLC

(57) ABSTRACT

A blockchain consensus method includes: on the basis of transaction data and a verifiable delay function, a node generating a target block, or synchronously acquiring a target block from other nodes; determining, from among multiple sub-blockchains, a target sub-blockchain based on information of a target block, and adding the target block to the target sub-blockchain; then, acquiring respective corresponding effective block sequences from the multiple sub-blockchains; performing global sorting on effective blocks on the basis of logic clocks respectively corresponding to acquired effective blocks, and acquiring a global blockchain. A global blockchain is acquired by using a means of (Continued)

multi-chain consensus, thereby improving the expandability and transaction throughput of a blockchain system in a large-scale open network environment. Acquiring a global blockchain by performing global sorting on effective blocks on the basis of logic clocks corresponding to the effective blocks can better improve the security of a multi-chain system.

16 Claims, 8 Drawing Sheets

(56) References Cited

FOREIGN PATENT DOCUMENTS

| CN | 110689345 | A | * | 1/2020 | ......... G06F 16/1837 |
| CN | 110798509 | A | * | 2/2020 | ......... G06F 16/2365 |
| CN | 111488202 | A | | 8/2020 | |
| CN | 111786952 | A | | 10/2020 | |
| CN | 112685796 | A | | 4/2021 | |
| CN | 109886681 | B | * | 6/2021 | |
| CN | 113886496 | A | * | 1/2022 | ......... G06F 16/2246 |
| CN | 114281888 | A | | 4/2022 | |
| IN | 202041013941 | A | | 5/2020 | |
| SG | 10202004063 | A1 | * | 1/2021 | |

OTHER PUBLICATIONS

Eshed Ram et al. "Spatially Coupled LDPC Codes With Sub-Block Locality", IEEE Transactions on Information Theory, vol. 67, No. 5, Feb. 16, 2021; pp. 2739-2757.

Zhang Ao, et al. "Survey of Research and Practices on Blockchain Privacy Protection", Journal of Software, vol. 31, No. 5, May 15, 2020, pp. 1406-1434.

* cited by examiner

| Block Head | global snapshot flag | block hash of the longest-clock block | transaction root hash | ...... |
|---|---|---|---|---|
| | verifiable output content | parent block hash | verifiable output proof | parent block proof |
| Block Body | transaction data actually included in the block | ...... | | |

BLOCKCHAIN CONSENSUS METHOD, APPARATUS, AND DEVICE, AND STORAGE MEDIUM

CROSS-REFERENCE TO RELATED APPLICATION

This application is a national phase entry under 35 U.S.C. § 371 of International Application No. PCT/CN2022/110336, filed on Aug. 4, 2022, which claims priority to Chinese Patent Application No. 202111277507.8, filed on Oct. 30, 2021, and entitled "BLOCKCHAIN CONSENSUS METHOD, APPARATUS, AND DEVICE, AND STORAGE MEDIUM," the entire content of all of which is incorporated herein by reference.

TECHNICAL FIELD

The present disclosure relates to the field of blockchain technology and, more particularly, to a blockchain consensus method, apparatus, device, and storage medium.

BACKGROUND

Blockchain is a novel application mode of computer technology that includes distributed data storage, peer-to-peer transmission, consensus mechanisms, encryption algorithms, etc. The consensus protocol of a blockchain is a crucial technology for the underlying blockchain platform, directly determining the security and performance of a blockchain system.

Traditional consensus protocols (such as raft protocol, practical byzantine fault tolerance (PBFT)) or their improved versions often rely on a coordinated approach based on state machine replication to achieve consensus. However, traditional consensus solutions have higher communication complexity, and the transaction performance of the system significantly decreases as the scale of network nodes increases. Therefore, they are more suitable for small-scale alliance chain networks and may struggle to adapt to the growing number of application nodes in the blockchain network environment.

SUMMARY

Embodiments of the disclosure provide a blockchain consensus method, apparatus, device, and storage medium that are configured to enhance the scalability and transaction throughput of a blockchain system in a large-scale open network environment.

In one aspect, embodiments of the disclosure provide a blockchain consensus method, applied to a node in a blockchain system, and the method includes: determining, from a plurality of sub-blockchains, a target sub-blockchain to which a target block belongs, and adding the target block to the target sub-blockchain, wherein the target block is generated based on transaction data or obtained by synchronizing with other nodes; obtaining, from the plurality of sub-blockchains, a sequence of valid blocks for each of the plurality of sub-blockchains, wherein each sequence of valid blocks include at least one valid block; and globally ranking the obtained valid blocks based on a logical clock corresponding to each of the obtained valid blocks, to obtain a global blockchain.

In another aspect, embodiments of the disclosure provide a blockchain consensus apparatus, applied to a node in a blockchain system, and the device includes: a matching module, configured to determine, from a plurality of sub-blockchains, a target sub-blockchain to which a target block belongs, and add the target block to the target sub-blockchain, wherein the target block is generated based on transaction data or obtained by synchronization with other nodes; a screening module, configured to obtain, from the plurality of sub-blockchains, a sequence of valid blocks for each of the plurality of sub-blockchains, wherein each sequence of valid blocks include at least one valid block; and a ranking module, configured to globally rank the obtained valid blocks based on a logical clock corresponding to each of the obtained valid blocks, to obtain a global blockchain.

Optionally, a logical clock of a valid block is the number of blocks passed along a logical clock path of the valid block, starting from the valid block until reaching a genesis block, where the logical clock path for the valid block is a path starting from that valid block, extending along directions towards longest-clock blocks until reaching the genesis block.

Optionally, the matching module is specifically configured for: merging other field information in fields of a block header of the target block excluding an auxiliary information field and hashing the merged data to obtain a package hash, where the other field information includes at least a global snapshot flag of the plurality of sub-blockchains, a transaction root hash of the transaction data, and a block hash of a longest-clock block pointed to by the target block, where the longest-clock block pointed to by the target block is a legal block with a largest logical clock detected by the node when generating the target block; processing the package hash using a verifiable delay function to obtain a verifiable output result; determining the target sub-blockchain to which the target block belongs, a corresponding parent block in the target sub-blockchain, and a corresponding parent block hash and a parent block proof based on the verifiable output result; and obtaining the target block based on the other field information, the verifiable output result, the parent block hash, the parent block proof, and the transaction data.

Optionally, the matching module is further configured for: before merging other field information in fields of a block header of the target block excluding an auxiliary information field and hashing the merged data to obtain a package hash, taking a global snapshot of the plurality of sub-blockchains to obtain a latest valid block in each sequence of valid blocks; building a first Merkle tree corresponding to the global snapshot based on a block hash of each of the obtained latest valid blocks; and taking a root hash of the first Merkle tree as the global snapshot flag of the plurality of sub-blockchains.

Optionally, the matching module is further configured for: before merging other field information in fields of a block header of the target block excluding an auxiliary information field and hashing the merged data to obtain a package hash, building a second Merkle tree based on the transaction data; and taking a root hash of the second Merkle tree as the transaction root hash of the transaction data.

Optionally, the matching module is further configured for: before determining the target sub-blockchain to which the target block belongs, a corresponding parent block in the target sub-blockchain, and a corresponding parent block hash and a parent block proof based on the verifiable output result, encrypting and hashing the verifiable output result to obtain a verifiable output hash; and confirming that the verifiable output hash is less than a block generation difficulty.

Optionally, the matching module is specifically configured for: using the verifiable output hash to take a modulus of the total number of sub-blockchains to determine the target sub-blockchain to which the target block belongs; and taking a valid block corresponding to the target sub-blockchain in a global snapshot as the parent block of the target block in the target sub-blockchain, and obtaining the parent block hash and the parent block proof of the parent block.

Optionally, the verifiable output result includes verifiable output content and verifiable output proof, and the matching module is further configured for: after determining the target sub-blockchain to which the target block belongs, a corresponding parent block in the target sub-blockchain, and a corresponding parent block hash and a parent block proof based on the verifiable output result, generating a target block hash for the target block based on a block hash of the longest-clock block pointed to by the target block, the global snapshot flag, the transaction root hash, the verifiable output content, and the parent block hash.

Optionally, the matching module is further configured for: receiving the target block sent by the other nodes and obtaining, from a block header of the target block, a verifiable output result, a parent block hash of a parent block, a parent block proof of the parent block, and a global snapshot flag; performing a basic verification on the target block based on the obtained verifiable output result, the parent block hash, the parent block proof, and the global snapshot flag; performing a difficulty verification on the target block based on the verifiable output result of the target block; and performing a clock verification on the target block based on a logical clock of the target block and a logical clock of the parent block.

The screening module is specifically configured for: for each of the plurality of sub-blockchains, performing the following steps: starting from a genesis block of a sub-blockchain, extending along sub-block directions, successively selecting blocks each associated with a block subtree having a maximum weight as valid blocks until there is no extended block, to obtain a sequence of valid blocks comprising the selected valid blocks, where a block subtree for a block includes the block and other block subtrees extending along the block, and a weight of a block subtree is a sum of block weights of all blocks in the block subtree, where a block weight of each block is a verifiable output hash of the block or a predetermined ratio of the verifiable output hash.

Optionally, the screening module is specifically configured for: each time selecting a block associated with a block subtree having a maximum weight as a valid block, the following steps are performed: for a most recently selected first valid block in the sub-blockchain, determining, from the sub-blockchain, at least one candidate sub-block connected to the first valid block and a corresponding block subtree for each of the at least one candidate sub-block; determining a weight of a block subtree associated with each of the at least one candidate sub-block, and determining a maximum-weight block subtree based on the determined weight of each block subtree; and selecting, from the at least one candidate sub-block, a candidate sub-block corresponding to the maximum-weight block subtree as a second valid block.

Optionally, the ranking module is specifically configured for: obtaining a target valid block from each sequence of valid blocks; and globally ranking target valid blocks based on logical clocks of the target valid blocks to obtain the global blockchain.

Optionally, the screening module is further configured for: for each valid block, performing the following steps: when a weight of a block's block subtree is greater than or equal to a stable threshold, taking the block as a stable block; and when a weight of a block's block subtree is less than the stable threshold, taking the block as an unstable block.

Optionally, the ranking module is specifically configured for: obtaining a latest stable block from each sequence of valid blocks; obtaining a minimum logical clock from logical clocks of the obtained latest stable blocks and using the minimum logical clock as a block clock boundary; selecting, from all stable blocks, target stable blocks whose logical clocks are less than or equal to the block clock boundary; and globally ranking the selected target stable blocks based on logical clocks of the selected target stable blocks to obtain the global blockchain.

Optionally, the ranking module is specifically configured for: globally ranking the selected target stable blocks in ascending order of logical clocks to obtain a preliminary ranking result; and when there are target stable blocks with an identical logical clock in the preliminary ranking result, ranking the target stable blocks with the identical logical clock based on sub-blockchain serial numbers or block hashes, to obtain the global blockchain.

In another aspect, embodiments of the disclosure provide a computer device, which includes a memory, a processor, and a computer program stored in the memory and executable on the processor, where the processor, when executing the program, implements the steps of the methods described above.

In another aspect, embodiments of the disclosure provide a computer-readable storage medium, which stores a computer program executable on a computer device, where the computer program, when executed on the computer device, causes the computer device to implement the steps of the methods described above.

In another aspect, embodiments of the disclosure provide a computer program product, which includes a computer program stored on a computer-readable storage medium, the computer program including program instructions that, when executed by a computer device, cause the computer device to implement the steps of the methods described above.

In the embodiments of the disclosure, as the plurality of sub-blockchains may share the processing capacity of high-concurrency blocks in a large-scale network environment, adopting a multi-chain consensus approach to obtain a global blockchain may thus enhance the scalability and transaction throughput of the blockchain system in a large-scale open network environment. Secondly, the logical clock corresponding to each block provides a more reliable measure of temporal relationships between blocks. Thus, based on the logical clock for each valid block to globally rank the valid blocks to obtain a global blockchain may enhance the security of the multi-chain system and facilitate further optimizations of the multi-chain system based on the enhanced security.

BRIEF DESCRIPTION OF THE DRAWINGS

To provide a clearer explanation of the technical solutions in the embodiments of the present disclosure, a brief introduction to the drawings in conjunction with the description of the embodiments will be given below. It is evident that the drawings in the following description are merely some embodiments of the present disclosure. Those skilled in the art may obtain additional drawings based on these drawings without exercising inventive efforts.

DETAILED DESCRIPTION OF THE EMBODIMENTS

To make the purposes, technical solutions, and beneficial effects of the present disclosure clearer, the following detailed description is provided in conjunction with the drawings and specific embodiments. It should be understood that the specific embodiments described here are merely for explaining the disclosure and are not intended to limit the disclosure.

For ease of understanding, the following explanations are provided for certain terms used in the embodiments of the present disclosure.

Blockchain: A novel application mode of computer technology that includes distributed data storage, peer-to-peer transmission, consensus mechanisms, encryption algorithms, and so on. Blockchain, essentially a decentralized database, is a series of data blocks associated through cryptographic methods. Each data block contains information about a batch of network transactions used to verify the validity (anti-counterfeiting) of the information and generate a next block. A blockchain may include a blockchain underlying platform, platform product service layer, and application service layer.

VDF: Verifiable delay function, a new cryptographic primitive with a determined execution time independent of the number of central processing unit (CPU) cores in a node. For a given input, its execution result is unique and verifiable.

GHOST: Greedy heaviest observed sub-tree, a GHOST protocol or heaviest sub-chain protocol, which is a consensus rule that improves proof-of-work. Starting from a genesis block, blocks associated with the heaviest block sub-trees are sequentially and successively selected as the current blocks.

Merkle Tree: A data structure organization method that outputs a unique value (usually a hash). The basic processes include ranking a dataset and performing hash operations in a hierarchical merging manner until a unique numerical value is formed. The optimal number of elements in a sequence is a power of 2, and any shortfall may be compensated by duplicating leaf node values.

Gossip Protocol: A message dissemination protocol where a node broadcasts a message to its surrounding nodes, which relay the message until the message covers the entire network. It is a typical message propagation method in blockchain networks.

PoW: Proof of work, a consensus mechanism where nodes compete by performing hash operations to meet specific conditions for block submission.

Figure 1:
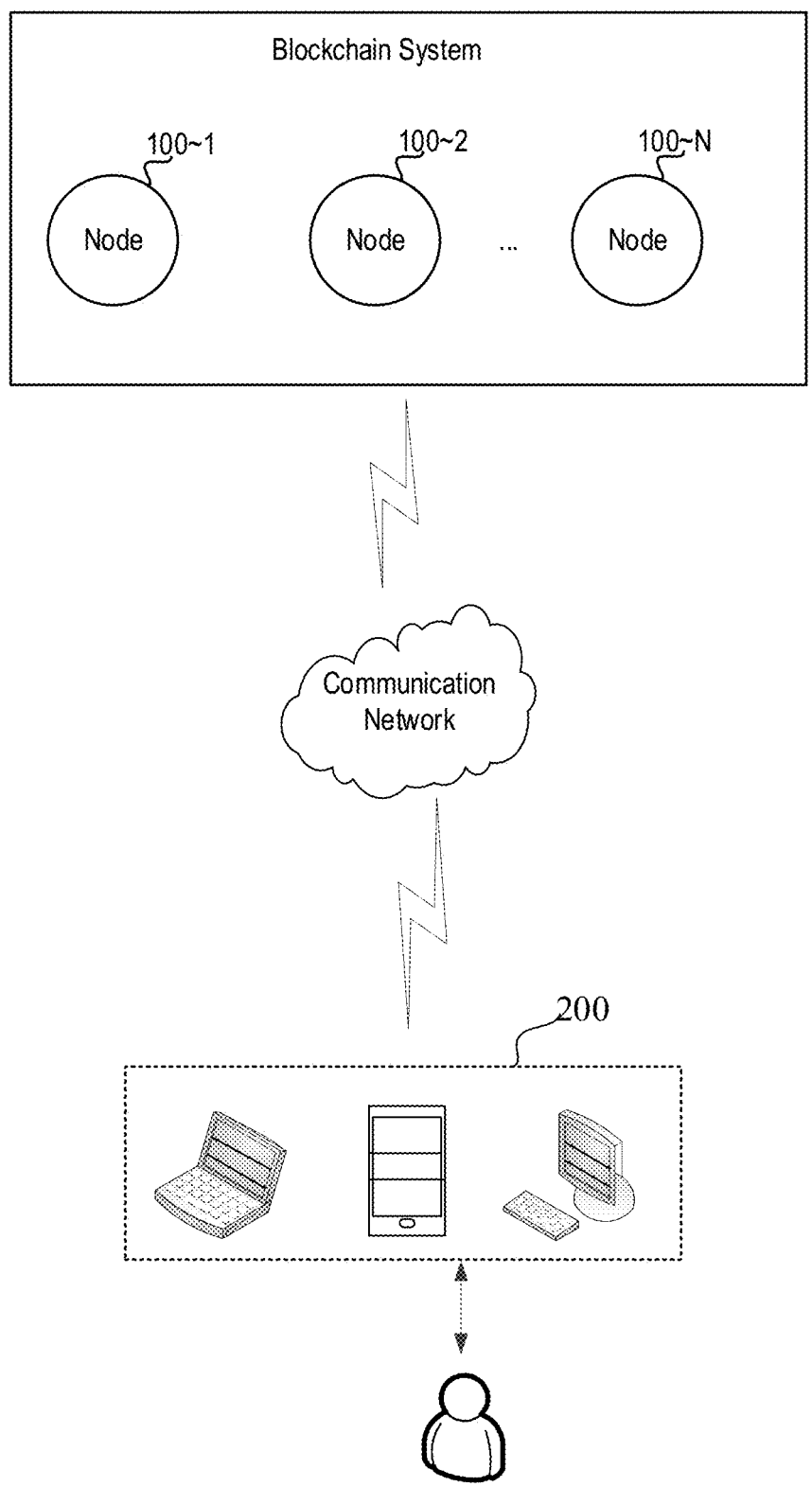
FIG. 1 illustrates a schematic diagram of a system architecture, according to embodiments of the disclosure.

FIG. 1 illustrates a schematic diagram of the architecture of a blockchain system, according to embodiments of disclosure. As shown in FIG. 1, the blockchain system may include N nodes, denoted as nodes 100-1, nodes 100-2, . . . , and nodes 100-N, where N is a positive integer. Any two nodes in the blockchain system may be communicatively connected, thereby collectively maintaining the blockchain system. Specifically, any two nodes may be connected through wired or wireless connections, which is not limited in the disclosure.

In the embodiments of the disclosure, nodes in the blockchain system may have various functions, such as routing functions, transaction processing functions, consensus functions, etc. Specifically, nodes in the blockchain system may transmit transaction data received from other nodes to more nodes to facilitate communication between the nodes. Alternatively, nodes in the blockchain system may be configured to record all historical transactions, or they may verify and record transactions, thereby generating new blocks in the blockchain.

It should be noted that a node in the blockchain system may be a physical machine (e.g., a server) or a thread or series of threads running on a server, which is not limited in the disclosure.

As shown in FIG. 1, the system architecture may also include client devices 200. The client devices 200 may connect to any node in the blockchain system by accessing the blockchain network. In specific applications, a client device 200 may send transaction data to any node in the blockchain system. After receiving the transaction data, that node in the blockchain system may synchronize the transaction data with other nodes in the blockchain system. When a node receives the transaction data, it may store the data in its internal transaction pool. Accordingly, upon receiving synchronized transaction data from that node, other nodes may also store the data in their respective transaction pools. If a node is determined to process multiple transactions, it may retrieve multiple transactions from its internal transaction pool for subsequent transaction processing and block consensus.

In the embodiments of the disclosure, for any node in the blockchain system illustrated in FIG. 1, the node generates a target block based on transaction data or obtains a target block by synchronizing with other nodes. A target sub-blockchain to which the target block belongs is then determined from a plurality of sub-blockchains, and the target block is then added to the determined target sub-blockchain. Subsequently, a sequence of valid blocks is obtained from each of the plurality of sub-blockchains, where each sequence of valid blocks includes at least one valid block. Based on the logical clock corresponding to each obtained valid block, a global ranking is performed on the obtained valid blocks, to obtain a global blockchain.

In the embodiments of the disclosure, as the plurality of sub-blockchains may share the processing capacity of high-concurrency blocks in a large-scale network environment, adopting a multi-chain consensus approach to obtain a global blockchain may thus enhance the scalability and transaction throughput of the blockchain system in a large-scale open network environment. Secondly, the logical clock corresponding to each block provides a more reliable measure of temporal relationships between blocks. Thus, based on the logical clock for each valid block to globally rank the valid blocks to obtain a global blockchain may enhance the security of the multi-chain system and facilitate further optimizations of the multi-chain system based on the enhanced security.

Figure 2:
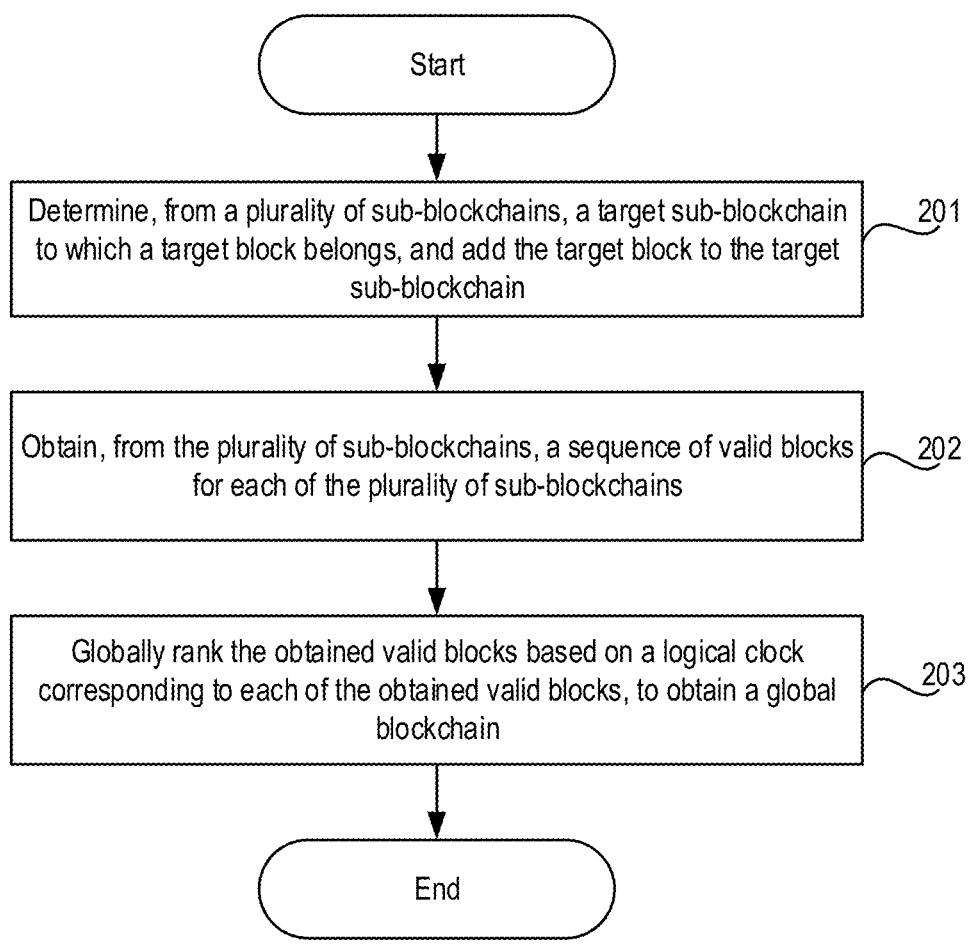
FIG. 2 illustrates a flowchart of a blockchain consensus method, according to embodiments of the disclosure.

Based on the system architecture shown in FIG. 1, embodiments of the disclosure further provide a flowchart of a blockchain consensus method, as illustrated in FIG. 2. The process may be executed by any node in the blockchain system shown in FIG. 1 and include the following steps:

Step S201: Determine, from a plurality of sub-blockchains, a target sub-blockchain to which a target block belongs, and add the target block to the target sub-blockchain.

Specifically, the plurality of sub-blockchains may be a plurality of parallel single chains, and the number of sub-blockchains may be configured according to practical considerations. During a specific configuration, the exact number of sub-blockchains depends on the estimated scale of nodes actually participating in the blockchain network and the local computing capacity of these nodes. The larger the scale of the blockchain network, the larger the number of sub-blockchains. However, it is essential not to excessively expand the number of sub-blockchains, to avoid a decline in system performance. The genesis blocks in the plurality of sub-blockchains may be the same or different. A sub-blockchain may or may not include forked blocks.

Figure 3:
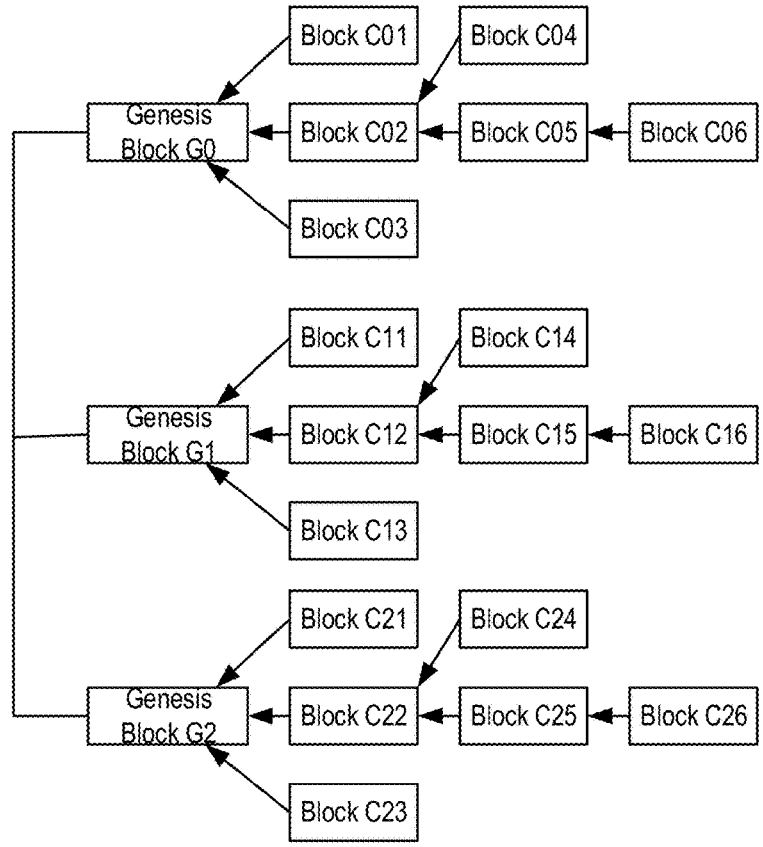
FIG. 3 illustrates a schematic diagram of a parallel multi-chain architecture, according to embodiments of the disclosure.

FIG. 3 illustrates an exemplary parallel multi-chain architecture, according to embodiments of the disclosure. The parallel multi-chain architecture includes sub-blockchains C0, C1, and C2. Sub-blockchain C0 includes a genesis block G0, a block C01, a block C02, a block C03, a block C04, a block C05, and a block C06. Sub-blockchain C1 includes a genesis block G1, a block C11, a block C12, a block C13, a block C14, a block C15, and a block C16. Sub-blockchain C2 includes a genesis block G2, a block C21, a block C22, a block C23, a block C24, a block C25, and a block C26.

Before initiating the blockchain consensus, all nodes in the blockchain system start from a common genesis block and the same configuration file to initialize the protocol. These nodes then proceed to generate new blocks in a bundle or synchronize blocks generated by other nodes. The related initialization parameters include block generation difficulty, VDF parameters, the quantity and series number of each sub-blockchain, and so on. A target block described above is generated by a node based on transaction data or obtained by synchronizing with other nodes. When configuring VDF parameters, the execution time of VDF should be configured to be greater than the average block propagation time in the blockchain network to facilitate sufficient interaction between nodes, thereby ensuring rapid network convergence and avoiding potential balance attacks on GHOST.

Step S202: Obtain, from the plurality of sub-blockchains, a sequence of valid blocks for each of the plurality of sub-blockchains.

Specifically, each sequence of valid blocks includes at least one valid block. At least one of the valid blocks has no forked block. After obtaining the corresponding sequence of valid blocks from a sub-blockchain, other blocks in that sub-blockchain may be removed, so that the sub-blockchain is updated to be the corresponding sequence of valid blocks.

Step S203: Globally rank the obtained valid blocks based on a logical clock corresponding to each of the obtained valid blocks, to obtain a global blockchain.

Specifically, a logical clock is configured to represent the temporal relationship between blocks. The logical clock of a valid block is the number of blocks (including the valid block and excluding the genesis block) passed along a logical clock path corresponding to the valid block, starting from the valid block until reaching a genesis block. Specifically, the logical clock path of a valid block is defined as follows: it starts from the valid block and extends along directions pointing to the longest-clock blocks until reaching the genesis block. A longest-clock block pointed to by a block is the legal block with the maximum logical clock detected by the node when generating that block. This block may be generated by the node or obtained by synchronizing with other nodes. The initial longest-clock block is the genesis block.

Figure 4:
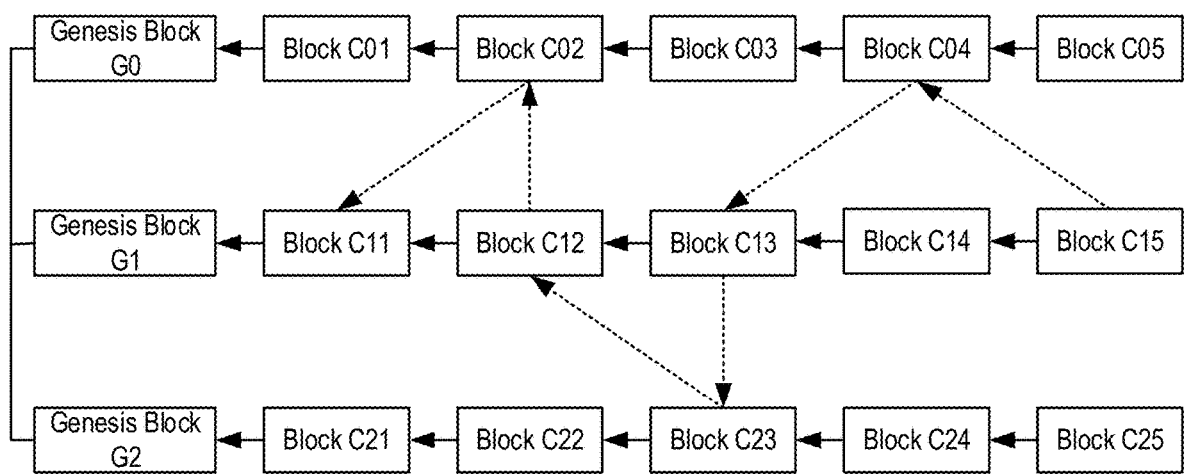
FIG. 4 illustrates a schematic diagram of another parallel multi-chain architecture, according to embodiments of the disclosure.

Referring to FIG. 4, an exemplary parallel multi-chain architecture is provided, according to the embodiments of the disclosure. The architecture includes sub-blockchains C0, C0, and C2. Sub-blockchain C0 includes a genesis block G0, a block C01, a block C02, a block C03, a block C04, and a block C05. Sub-blockchain C1 includes a genesis block G1, a block C11, a block C12, a block C13, a block C14, and a block C15. Sub-blockchain C2 includes a genesis block G2, a block C21, a block C22, a block C23, a block C24, and a block C25.

Assume block C15 is a valid block. The longest-clock block pointed to by C15 is block C04, the longest-clock block pointed to by a block C04 is a block C13, the longest-clock block pointed to by a block C13 is a block C23, the longest-clock block pointed to by a block C23 is a block C12, the longest-clock block pointed to by a block C12 is a block C02, the longest-clock block pointed to by a block C02 is a block C11, and the longest-clock block pointed to by a block C11 is a genesis block G1.

From FIG. 4, it can be seen that the logical clock path for block C15 is: C15→C04→C13→C23→C12→C02→C11→G1. Therefore, the logical clock corresponding to block C15 is 7.

After obtaining the logical clock for each valid block, the valid blocks may be globally ranked in ascending order of logical clocks. In some embodiments, specific rules may be employed to filter out certain valid blocks, and then the retained valid blocks may be globally ranked in ascending order of logical clocks to obtain a global blockchain. Additionally, when there are multiple valid blocks with an identical logical clock, the ranking of these valid blocks may be conducted based on the sub-blockchain serial number or block hash for each valid block. The final output is a global blockchain.

It should be noted that in the embodiments of the disclosure, a node may trigger a global ranking to obtain a global blockchain each time a block is added to a corresponding sub-blockchain, or the global ranking may be triggered to obtain the global blockchain at predefined intervals or after a predefined number of blocks are generated. The predefined intervals and the predefined number of blocks may be adjusted based on actual applications. Alternatively, a global ranking may be triggered only upon receiving an external triggering command to obtain a global blockchain, which is not limited in the present disclosure.

In the embodiments of the disclosure, as the plurality of sub-blockchains may share the processing capacity of high-concurrency blocks in a large-scale network environment, adopting a multi-chain consensus approach to obtain a global blockchain may thus enhance the scalability and transaction throughput of the blockchain system in a large-scale open network environment. Secondly, the logical clock corresponding to each block provides a more reliable measure of temporal relationships between blocks. Thus, based on the logical clock for each valid block to globally rank the valid blocks to obtain a global blockchain may enhance the security of the multi-chain system and facilitate further optimizations of the multi-chain system based on the enhanced security.

Figures 5, 6:
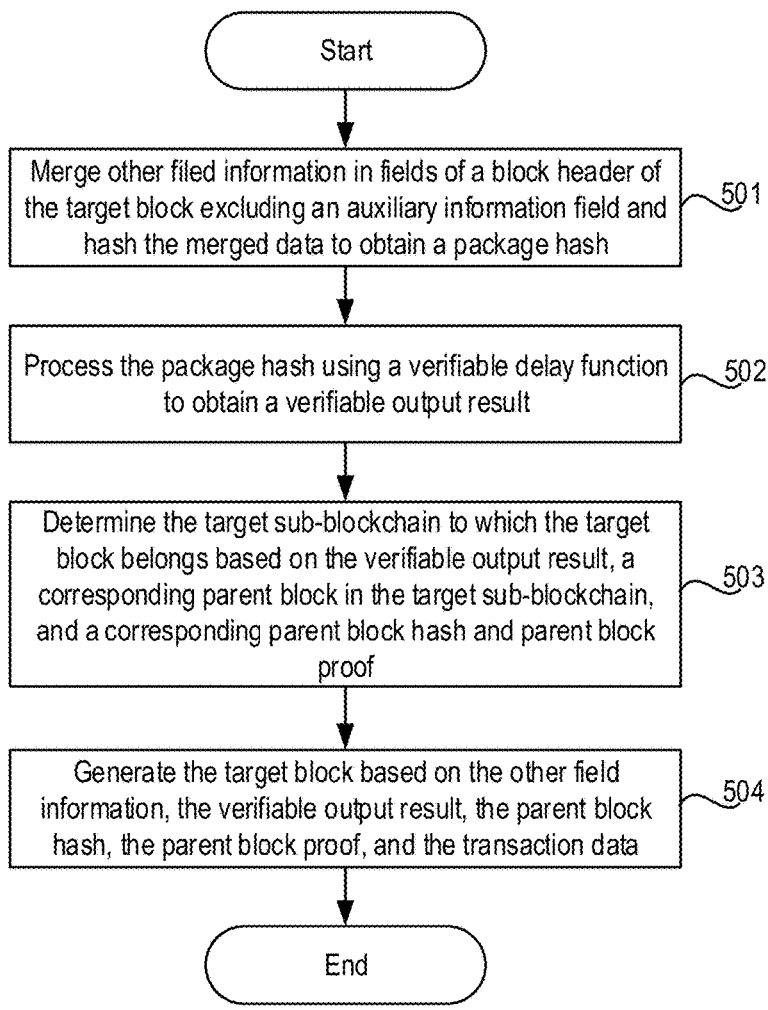
FIG. 5 illustrates a flowchart of a method for generating a target block, according to embodiments of the disclosure.
FIG. 6 illustrates a schematic diagram of a block structure, according to embodiments of the disclosure.

Optionally, in the above Step S201, a node may use at least one of the following implementation methods to generate a target block based on the transaction data as shown in FIG. 5, which includes the following steps.

Step S501: Merge other filed information in fields of a block header of the target block excluding an auxiliary information field and hash the merged data to obtain a package hash.

Specifically, the other field information includes at least a global snapshot flag of the plurality of sub-blockchains, a transaction root hash of the transaction data, and a block hash of the longest-clock block pointed to by the target block. The longest-clock block pointed to by the target block is a legal block with the maximum logical clock detected by the node when generating the target block. Additionally, the other field information may further include the block hash of at least one sampled block corresponding to the target block.

Specifically, in the embodiments of the disclosure, at least one of the following implementation methods is used to obtain the global snapshot flag of the plurality of sub-blockchains.

First, take a global snapshot of the plurality of sub-blockchains to obtain a latest valid block in each sequence of valid blocks. When taking the snapshot, rank the obtained latest valid blocks, for example, in order of the sub-blockchain serial number to which each latest valid block belongs. Then, based on the block hash of each latest valid block, build a first Merkle tree corresponding to the global snapshot. The root hash of the first Merkle tree is then used as the global snapshot flag for the plurality of sub-blockchains.

In the embodiments of the disclosure, at least one of the following implementation methods is used to obtain the transaction root hash of the transaction data: Build a second Merkle tree based on the transaction data, and then use the root hash of the second Merkle tree as the transaction root hash of the transaction data.

It should be noted that the embodiments of the disclosure may also use other hash algorithms to obtain the global snapshot flag of the plurality of sub-blockchains and the transaction root hash of the transaction data, which is not limited in the present disclosure.

After obtaining the other field information excluding the auxiliary information field, the various field information is merged in a determined order, and then the package hash corresponding to the merged data is calculated.

Step S502: Process the package hash using a verifiable delay function (VDF) to obtain a verifiable output result.

In some embodiments, when a node is a multi-core CPU node, the verifiable delay function may be executed in parallel using multiple threads. Different threads correspond to different transaction content, so as to achieve multi-threaded parallel participation in VDF, thereby ensuring the input matching the processing capacity of the node.

Step S503: Determine the target sub-blockchain to which the target block belongs based on the verifiable output result, a corresponding parent block in the target sub-blockchain, and a corresponding parent block hash and parent block proof.

In some embodiments, after obtaining the verifiable output result, a difficulty verification may also be performed on the target block based on the verifiable output result.

Specifically, encrypt and hash the verifiable output result to obtain a verifiable output hash. Then, check whether the verifiable output hash is less than a block generation difficulty. If the verifiable output hash is less than the block generation difficulty, confirm the target block as a legal block and proceed to the next steps. Otherwise, consider the target block as an illegal block and discard it. The block generation difficulty may be a fixed value or may be adjusted periodically.

Use the verifiable output hash to take a modulus of the total number of sub-blockchains to determine the target sub-blockchain to which the target block belongs. Next, take the latest valid block corresponding to the target sub-blockchain in the global snapshot as the parent block of the target block in the target sub-blockchain. Obtain the corresponding parent block hash and parent block proof of the parent block, where the parent block proof may be a Merkle tree proof.

Step S504: Generate the target block based on the other field information, the verifiable output result, the parent block hash, the parent block proof, and the transaction data.

Specifically, the verifiable output result includes the verifiable output content and verifiable output proof. The target block includes a block header and a block body. Add the block hash of the longest-clock block pointed to by the target block, the global snapshot flag, the transaction root hash, the verifiable output result, the parent block hash, and the parent block proof to the block header, and add the transaction data to the block body. It should be noted that the data in the target block is not limited to the types described above, and it may include more information fields according to specific developments, which is not limited in the disclosure.

FIG. 6 illustrates an exemplary block structure, including a block header and a block body. The block header includes the global snapshot flag, the block hash of the longest-clock block, the transaction root hash, the verifiable output content, the parent block hash, the verifiable output proof, the parent block proof, and so on. The block body includes the transaction data actually included in the block.

Besides obtaining the target block, in the embodiments of the disclosure, a target block hash is also generated based on the block hash of the longest-clock block pointed to by the target block, the global snapshot flag, the transaction root hash, the verifiable output content, and the parent block hash. The target block hash is used to uniquely identify the target block.

Optionally, after obtaining the target block, the node may broadcast the target block to the network. Blockchain network broadcasting methods may use protocols like Gossip. Other nodes, upon receiving the target block, may add it to a local target sub-blockchain.

In the embodiments of the disclosure, node-generated blocks are achieved by executing a verifiable delay function with a specific difficulty. This method provides a more reliable measure of temporal relationships between blocks without relying on traditional proof-of-work mechanisms. This enhances the scalability and transaction throughput of the blockchain system in a large-scale open network environment.

Optionally, in the above Step S201, the target block may also be obtained by synchronizing with other nodes.

Specifically, a node receives a target block sent by another node and extracts the verifiable output result, the parent block hash of the parent block, the parent block proof of the parent block, and the global snapshot flag from the block header of the target block. For the specific processes of generating target blocks by other nodes, refer to the above-described Steps S501 to S505, the detail of which is not reiterated here.

Before adding the target block to the local sub-blockchain, a node needs to verify the obtained target block. The verification process includes one or more of the following processes.

1. Perform a basic verification on the target block based on the verifiable output result, the parent block hash of the parent block, the parent block proof of the parent block, and the global snapshot flag.

Specifically, verify whether the verifiable output result is correct. The verification rules may be defined by the verifiable delay function itself.

Determine the target sub-blockchain based on the parent block hash of the parent block and the parent block proof of the parent block obtained from the block header. Encrypt and hash the verifiable output result obtained from the block header to obtain the verifiable output hash. Use the verifiable output hash to determine a reference sub-blockchain to which the target block belongs by taking the modulus of the total number of sub-blockchains.

Check if the target sub-blockchain matches the reference sub-blockchain. If the target sub-blockchain matches the reference sub-blockchain, determine whether the parent block is the corresponding block in the global snapshot based on the parent block proof of the parent block and the global snapshot flag obtained from the block header. If the parent block is the corresponding block in the global snapshot, determine the target block as a legal block; otherwise, determine the target block as an illegal block and discard it.

2. Perform a difficulty verification on the target block based on the verifiable output result corresponding to the target block.

Specifically, encrypt and hash the verifiable output result obtained from the block header to get a verifiable output hash. Check if the verifiable output hash is less than the block generation difficulty. If the verifiable output hash is less than the block generation difficulty, determine the target block as a legal block; otherwise, determine the target block as an illegal block and discard it.

3. Perform a clock verification on the target block based on the logical clock of the target block and the logical block of the parent block.

Specifically, calculate the logical clock of the target block and the logical block of the parent block using the methods described earlier. Check if the logical clock of the target block is greater than or equal to the logical clock of the parent block. If the logical clock of the target block is greater than or equal to the logical clock of the parent block, determine the target block as a legal block; otherwise, determine the target block as an illegal block and discard it.

After using one or more of the above verification processes to verify the target block, if the target block is determined to be legal, add the target block to the corresponding sub-blockchain. If the target block is determined to be illegal, discard it.

In the embodiments of the disclosure, after receiving a target block from other nodes, a node performs multidimensional verifications on the target block. The target block is added to the corresponding sub-blockchain only until passing the multidimensional verifications, thereby ensuring the security of the blockchain system.

Optionally, in the above Step S202, for each of the plurality of sub-blockchains, the following approach may be used to obtain the corresponding sequence of valid blocks.

Start from the genesis block of a sub-blockchain and extend along the sub-block directions to sequentially select blocks corresponding to the block subtrees with the maximum weights as the valid blocks until there are no more extending blocks. This results in a sequence of valid blocks comprising the selected valid blocks.

Specifically, a block's block subtree includes the block itself and other block subtrees extending along that block. The weight of a block subtree is the sum of the block weights of all blocks in that block subtree. The block weight of each block is determined by the verifiable output hash of each block or a predetermined ratio of the verifiable output hash.

Rather than simply setting the block weight of each block to a same value, determine the block weight of each block based on the verifiable output hash of each block. This improves the convergence speed of a single chain.

Figure 7:
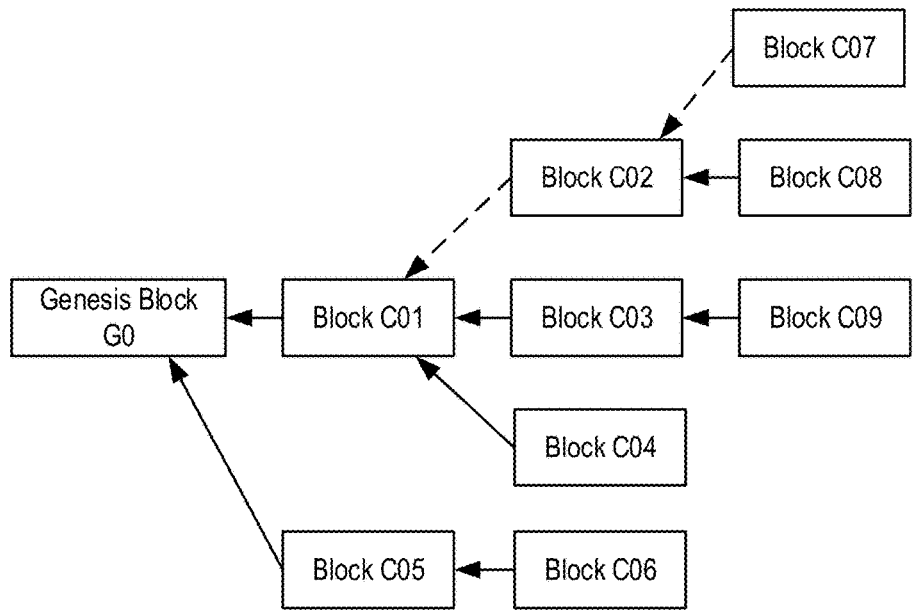
FIG. 7 illustrates a schematic diagram of a sub-blockchain structure, according to embodiments of the disclosure.

Refer to FIG. 7, an exemplary schematic diagram of a sub-blockchain structure is provided. This sub-blockchain includes a genesis block G0, a block C01, a block C02, a block C03, a block C04, a block C05, a block C06, a block C07, a block C08, and a block C09.

Taking block C01 as an example, the block subtree of block C01 includes block C01, block C02, block C03, block C04, block C07, block C08, and block C09. The weight of this block subtree is the sum of the block hashes corresponding to each of these blocks.

In some embodiments, each time a block whose block subtree has the maximum weight is selected as a valid block, the process includes the following steps.

For a latest selected first valid block in a sub-blockchain, determine, according to the sub-blockchain, at least one candidate sub-block connected to the first valid block and a block subtree corresponding to each of the at least one candidate sub-block. Next, determine the weight of the block subtree corresponding to each of the at least one candidate sub-block. Based on the obtained weights, determine, from the obtained block subtrees, a block subtree with the maximum weight. Select, from the at least one candidate sub-block, a candidate sub-block corresponding to the block subtree with the maximum weight as a second valid block.

Specifically, in the initial state, the genesis block on a sub-blockchain is the first valid block. Next, sequentially select a second valid block along the extension direction of the sub-blockchain.

For example, consider the sub-blockchain shown in FIG. 7. In the first time of selecting a valid block, the genesis block G0 is chosen as the first valid block. The blocks connected to the genesis block G0 include block C01 and block C05.

Block C01's block subtree 1 includes block C01, block C02, block C03, block C04, block C07, block C08, and block C09. The weight of the block subtree 1 is the sum of the block hashes corresponding to block C01, block C02, block C03, block C04, block C07, block C08, and block C09.

Block C05's block subtree 2 includes block C05 and block C06. The weight of the block subtree 2 is the sum of the block hashes corresponding to block C05 and block C06. Since the weight of the block subtree 1 is greater than the weight of the block subtree 2, the block subtree 1 is the maximum-weight block subtree. Therefore, block C01 corresponding to the block subtree 1 is selected as the second valid block.

In the second time of selecting a valid block, block C01 is chosen as the first valid block, and the blocks connected to block C01 include block C02, block C03, and block C04.

Block C02's block subtree 3 includes block C02, block C07, and block C08. The weight of the block subtree 3 is the sum of the block hashes corresponding to block C02, block C07, and block C08.

Block C03's block subtree 4 includes block C03 and block C09. The weight of the block subtree 4 is the sum of the block hashes corresponding to block C03 and block C09.

Block C04's block subtree 5 includes block C04. The weight of block subtree 5 is the block hash corresponding to block C04. Since the weight of the block subtree 3 is greater than the weight of block subtree 4 and the weight of the block subtree 5, the block subtree 3 is the maximum-weight block subtree. Therefore, block C02 corresponding to the block subtree 3 is selected as the second valid block.

In the third time of selecting a valid block, block C02 is chosen as the first valid block, and the blocks connected to block C02 include block C07 and block C08.

Block C07's block subtree 6 includes block C07. The weight of the block subtree 6 is the block hash corresponding to block C07.

Block C08's block subtree 7 includes block C08. The weight of the block subtree 7 is the block hash corresponding to block C08.

Since the weight of the block subtree 6 is greater than the weight of the block subtree 7, the block subtree 6 is the maximum-weight block subtree. Therefore, block C07 corresponding to the block subtree 6 is selected as the second valid block.

There are no further extended blocks after block C07, so the process of selecting valid blocks ends, resulting in a sequence of valid blocks: genesis block G0, block C01, block C02, and block C07.

In the embodiments of the disclosure, starting from the genesis block of each sub-blockchain, valid blocks are sequentially selected from blocks corresponding to block subtrees having the maximum weight to form a sequence of valid blocks comprising the selected valid blocks. Applying the "heaviest sub-chain" concept to the transformation of a single chain based on VDF may improve the security of a multi-chain system and further enhance the system performance upper limit within the processing capabilities of the node.

Furthermore, after obtaining the sequence of valid blocks corresponding to each sub-blockchain, valid blocks in each sequence may be divided into stable blocks and unstable blocks.

Specifically, for each valid block, the following steps are executed.

If the weight of a block's corresponding block subtree is greater than or equal to a stability threshold, the block is considered a stable block. If the weight of a block's corresponding block subtree is less than the stability threshold, the block is considered an unstable block. The stability threshold is configured based on actual applications.

By classifying the obtained valid blocks into stable blocks and unstable blocks, it becomes easier to monitor the state of the sub-blockchains in real time. It also facilitates the subsequent ranking of all valid blocks to obtain a stable global blockchain.

Optionally, in the above Step S203, at least the following methods are used in the embodiments of the disclosure to globally rank the obtained valid blocks to obtain a global blockchain.

Implementation Method 1: Obtain a target valid block from each sequence of valid blocks. Globally rank the obtained target valid blocks based on logical clocks corresponding to the obtained target valid blocks, to form the global blockchain.

Specifically, randomly select a target valid block from each sequence of valid blocks. Then, globally rank the selected target valid blocks in ascending order of logical clocks. In case of an identical logical clock among target valid blocks, rank the target valid blocks with the identical logical clock based on sub-blockchain serial numbers or block hashes to obtain the global blockchain.

Figure 8:
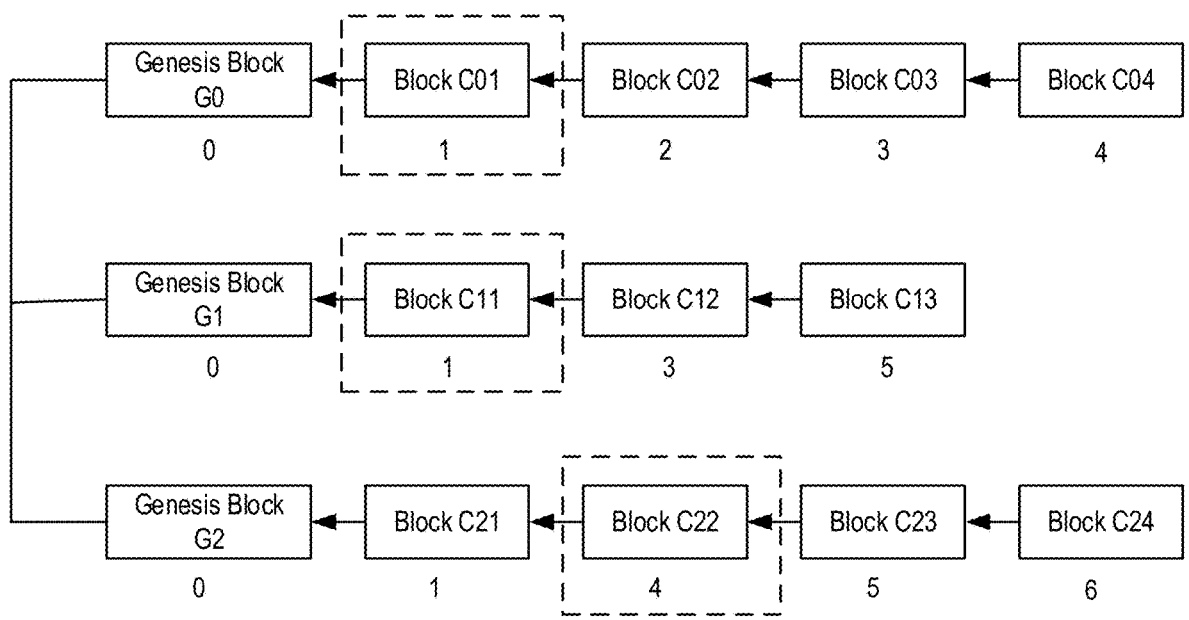
FIG. 8 illustrates a schematic diagram of another parallel multi-chain architecture, according to embodiments of the disclosure.

FIG. 8 illustrates an exemplary parallel multi-chain architecture according to the embodiments of the disclosure. The parallel multi-chain architecture includes sub-blockchains C0, C1, and C2. Sub-chain C0 includes a genesis block G0 (logical clock: 0), a block C01 (logical clock: 1), a block C02 (logical clock: 2), a block C03 (logical clock: 3), and a block C04 (logical clock: 4). Sub-chain C1 includes a genesis block G1 (logical clock: 0), a block C11 (logical clock: 1), a block C12 (logical clock: 3), and a block C13 (logical clock: 5). Sub-chain C2 includes a genesis block G2 (logical clock: 0), a block C21 (logical clock: 1), a block C22 (logical clock: 4), a block C23 (logical clock: 5), and a block C24 (logical block: 6).

Select block C01 from the sub-blockchain C0, block C11 from the sub-blackchin C1, and block C22 from the sub-blackchin C2 as target valid blocks.

Globally rank the selected target valid blocks in ascending order of logical clocks. If there are target valid blocks having an identical logical clock, rank these target valid blocks based on the serial numbers of the sub-blockchains. The resulting global blockchain is: block C01, block C11, and block C22.

Implementation Method 2: Obtain the latest stable block from each sequence of valid blocks. Obtain the minimum logical clock from the logical clocks corresponding to the obtained latest stable blocks, and use the minimal logical clock as a block clock boundary. Identify target stable blocks from stable blocks whose logical clock is less than or equal to the block clock boundary. Based on the logical clocks corresponding to the obtained target stable blocks, globally rank these target stable blocks to obtain a global blockchain.

Specifically, globally rank the target stable blocks in ascending order of logical clocks to obtain a preliminary ranking result. If there are target stable blocks with an identical logical clock in the preliminary ranking result, rank these target stable blocks based on serial numbers or block hashes of the sub-blockchains to obtain the global blockchain.

When ranking the target stable blocks with the identical logical clock based on serial numbers or block hashes of the sub-blockchains, also rank these blocks in ascending order.

Figure 9:
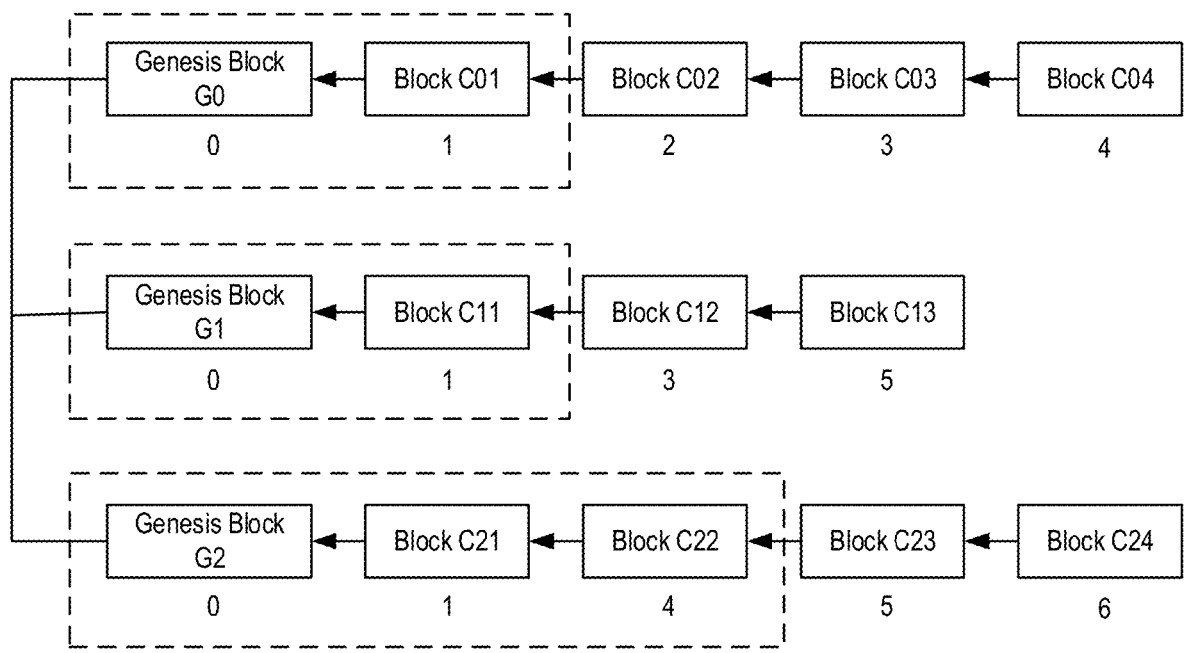
FIG. 9 illustrates a schematic diagram of another parallel multi-chain architecture, according to embodiments of the disclosure.

FIG. 9 illustrates an exemplary parallel multi-chain architecture according to the embodiments of the disclosure. The parallel multi-chain architecture includes sub-blockchains C0, C1, and C2. Sub-chain C0 includes a genesis block G0 (logical clock: 0), a block C01 (logical clock: 1), a block C02 (logical clock: 2), a block C03 (logical clock: 3), and a block C04 (logical clock: 4). Sub-chain C1 includes a genesis block G1 (logical clock: 0), a block C11 (logical clock: 1), a block C12 (logical clock: 3), and a block C13 (logical clock: 5). Sub-chain C2 includes a genesis block G2

(logical clock: 0), a block C21 (logical clock: 1), a block C22 (logical clock: 4), a block C23 (logical clock: 5), and a block C24 (logical block: 6).

Assume that the stable blocks in sub-chain C0 include genesis block G0 and block C01, with the latest stable block being block C01. In sub-chain C1, the stable blocks include genesis block G1 and block C11, with the latest stable block being block C11. In sub-chain C2, the stable blocks include genesis block G2, block C21, and block C22, with the latest stable block being block C22.

Among the logical blocks of the above latest stable blocks, the minimum logical clock is 1, so the block clock boundary is determined to be 1.

Among the stable blocks in the sub-blockchain C0, the target stable blocks whose logical clock is less than or equal to the block clock boundary include genesis block G0 and block C01.

Among the stable blocks in the sub-blockchain C1, the target stable blocks whose logical clock is less than or equal to the block clock boundary include genesis block G1 and block C11.

Among the stable blocks in the sub-blockchain C2, the target stable blocks whose logical clock is less than or equal to the block clock boundary include genesis block G2 and block C21.

Globally rank the selected target stable blocks in ascending order of logical clocks. When there are target stable blocks with an identical logical clock, rank these target stable blocks with the identical logical clock in ascending order of serial numbers of the sub-blockchains. The obtained global blockchain is: genesis block G0, genesis block G1, genesis block G2, block C01, block C11, and block C21.

In the embodiments of the disclosure, the "heaviest sub-chain" concept is applied to carry out single-chain transformation based on VDF, and a global blockchain is built based on the block temporal relationship corresponding to the block logical clocks. This introduces a more reliable measure of temporal relationship, thus improving the security of the multi-chain system, and the system performance upper limit is further improved within the node processing capabilities.

Furthermore, after obtaining the global blockchain, determine whether there are duplicate or conflicting transactions between different blocks in the global blockchain (for example, the same transaction is packaged repeatedly). Specifically, transactions in each block are sequentially executed according to the order of blocks in the blockchain. If a transaction in a current block has been executed before, it is determined that the transaction is an illegal transaction and will not be executed. Otherwise, it is determined that the transaction is legal and executed, and the system state is updated at the same time.

Figure 10:
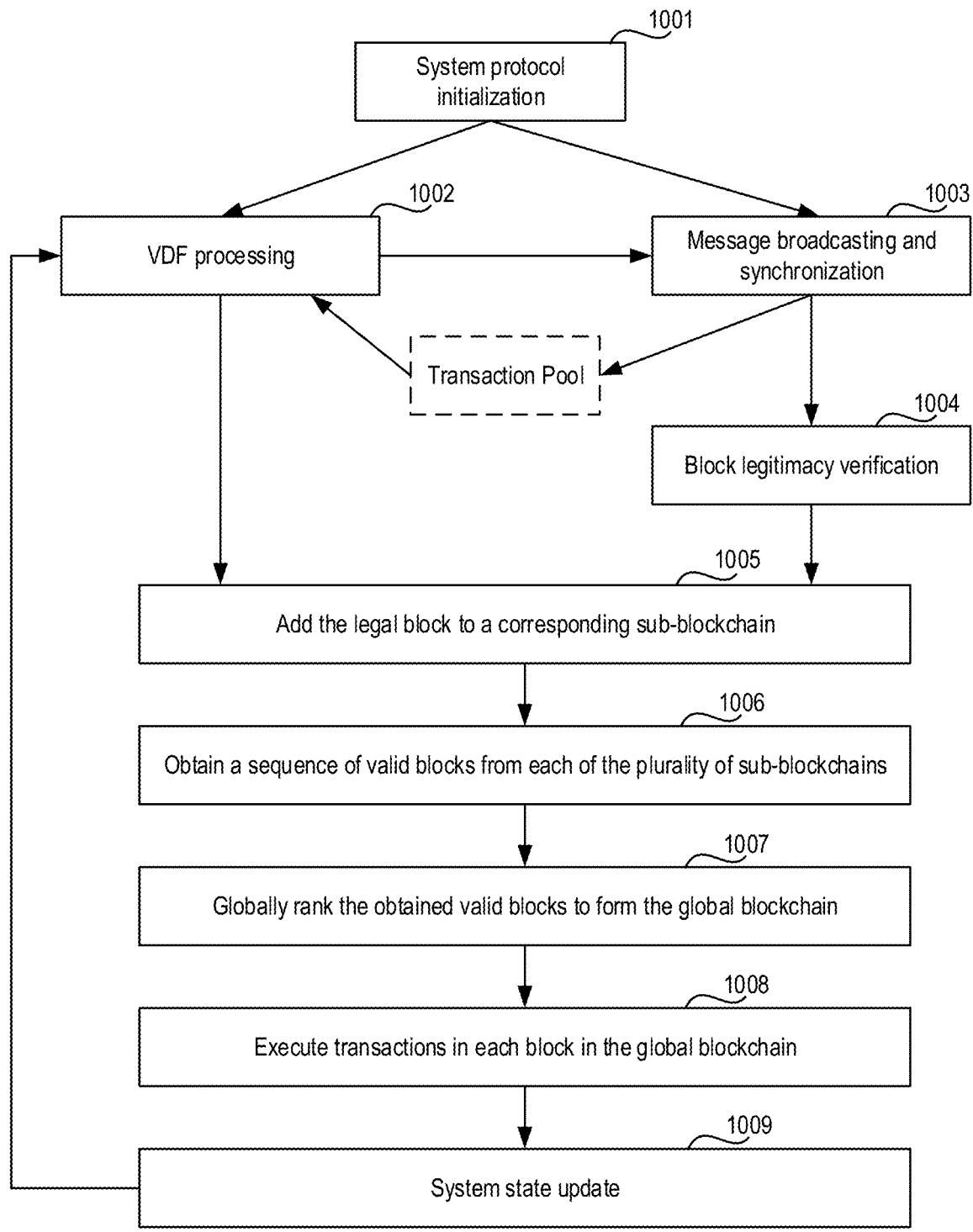
FIG. 10 illustrates a flowchart of another blockchain consensus method, according to embodiments of the disclosure.

To better explain the embodiments of the disclosure, a blockchain consensus method consistent with the embodiments of the disclosure is described hereinafter in conjunction with specific embodiments. The process flow of this method may be performed by any node of the blockchain systems shown in FIG. 1. As shown in FIG. 10, the process flow includes the following steps.

Step S1001: System protocol initialization

Specifically, a node first initializes protocol-related parameters, such as the block generation difficulty, VDF parameters, quantity and serial numbers of the sub-blockchains, blockchain network identity, block size, local public and private key account configurations, etc.

Step S1002: VDF process.

Specifically, obtain transaction data from the transaction pool. Select a legal block with the maximum logical clock, detected by the node in generating a target block, as the longest-clock block pointed to by the target block. Obtain the block hash of the longest-clock block.

Capture a global snapshot of the plurality of sub-blockchains to obtain a latest valid block for each sequence of valid blocks. Build a first Merkle tree corresponding to the global snapshot based on the block hash of each latest valid block. Use the root hash of the first Merkle tree as the global snapshot flag for the plurality of sub-blockchains.

Build a second Merkle tree based on the transaction data. Use the root hash of the second Merkle tree as the transaction root hash of the transaction data.

Merge the block hash of the longest-clock block, the global snapshot flag of the plurality of sub-blockchains, and the transaction root hash. Calculate the package hash for the merged data, and apply VDF for processing the package hash to obtain a verifiable output result. The verifiable output result includes verifiable output content and verifiable output proof.

Encrypt and hash the verifiable output result to obtain a verifiable output hash. Check if the verifiable output hash is less than a block generation difficulty. If the verifiable output hash is less than the block generation difficulty, the target block is considered as a legal block, and the subsequent steps are executed. Otherwise, the target block is considered as an illegal block and is discarded.

After passing the difficulty check, use the verifiable output hash to take the modulus of the total number of sub-blockchains, to determine the target sub-blockchain to which the target block belongs. Use the valid block corresponding to the target sub-blockchain in the global snapshot as the parent block of the target block in the target sub-blockchain. Obtain the parent block hash and the parent block proof of the parent block.

Add the block hash of the longest-clock block, the global snapshot flag, the transaction root hash, the verifiable output result, the parent block hash, and the parent block proof to the block header, and add transaction data to the block body, to generate the target block.

Generate the target block hash of the target block based on the block hash of the longest-clock block, the global snapshot flag, the transaction root hash, the verifiable output content, and the parent block hash.

Step S1003: Message broadcasting and synchronization.

The node broadcasts the target block to other nodes, and also synchronizes blocks generated by other nodes at the same time. Transaction data for the synchronized blocks is added to the transaction pool.

Step S1004: Block legitimacy verification.

Specifically, upon receiving a block from other nodes, the node performs the basic verification, difficulty verification, and clock verification. If these verifications are passed, the received block is considered legal; otherwise, the received block is considered illegal.

Step S1005: Add the legal block to a corresponding sub-blockchain.

If the block is legal, add the block to the corresponding sub-blockchain.

Step S1006: Obtain a sequence of valid blocks from each of the plurality of sub-blockchains.

Specifically, for each sub-blockchain, start from its genesis block of the sub-blockchain and extend along the sub-block directions to sequentially select blocks associated with the block subtrees with the maximum weights as valid blocks until there are no more extending blocks. This results in a sequence of valid blocks comprising the selected valid blocks.

A block's block subtree includes the block itself and other block subtrees extended along that block. The weight of a block subtree is the sum of the block weights of each block in the block subtree. The block weight of each block is determined by the verifiable output hash of the block or a predefined ratio of the verifiable output hash.

Step S1007: Globally rank the obtained valid blocks to form the global blockchain.

Specifically, the valid blocks in each sequence of valid blocks are divided into stable blocks and unstable blocks. Obtain the latest stable block from each sequence of valid blocks, respectively. Obtain the minimum logical clock from the logical clocks corresponding to each of the latest stable blocks, and use the minimum logical clock as the block clock boundary. From the stable blocks, identify target stable blocks whose logical clock is less than or equal to the block clock boundary.

Step S1008: Execute transactions in each block in the global blockchain.

Execute the transactions in each block according to the block order.

Step S1009: System state update and proceed to Step S1002.

In the embodiments of the disclosure, as the plurality of sub-blockchains may share the processing capacity of high-concurrency blocks in a large-scale network environment, adopting a multi-chain consensus approach to obtain a global blockchain may thus enhance the scalability and transaction throughput of the blockchain system in a large-scale open network environment. Secondly, the logical clock corresponding to each block provides a more reliable measure of temporal relationships between blocks. Thus, based on the logical clock for each valid block to globally rank the valid blocks to obtain a global blockchain may enhance the security of the multi-chain system and facilitate further optimizations of the multi-chain system based on the enhanced security.

Based on similar technological concepts, embodiments of the disclosure provide a schematic diagram of a blockchain consensus apparatus applicable to any node in a blockchain system.

Figure 11:
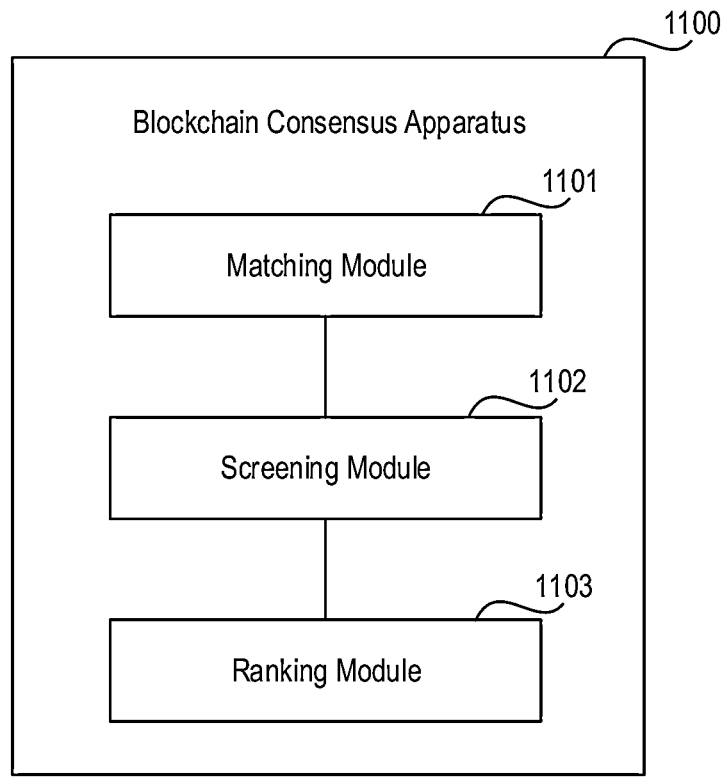
FIG. 11 illustrates a schematic diagram of a blockchain consensus apparatus, according to embodiments of the disclosure.

As shown in FIG. 11, the device 1100 includes: a matching module 1101, configured to determine, from a plurality of sub-blockchains, a target sub-blockchain to which a target block belongs, and add the target block to the target sub-blockchain, where the target block is generated based on transaction data or obtained by synchronization with other nodes; a screening module 1102, configured to obtain, from the plurality of sub-blockchains, a sequence of valid blocks for each of the plurality of sub-blockchains, where each sequence of valid blocks include at least one valid block; and a ranking module 1103, configured to globally rank the obtained valid blocks based on a logical clock corresponding to each of the obtained valid blocks, to obtain a global blockchain.

Optionally, a logical clock of a valid block is the number of blocks passed along a logical clock path of the valid block, starting from the valid block until reaching a genesis block, where the logical clock path for the valid block is a path starting from that valid block, extending along directions towards longest-clock blocks until reaching the genesis block.

Optionally, the matching module 1101 is specifically configured for: merging other field information in fields of a block header of the target block excluding an auxiliary information field and hashing the merged data to obtain a package hash, where the other field information includes at least a global snapshot flag of the plurality of sub-blockchains, a transaction root hash of the transaction data, and a block hash of a longest-clock block pointed to by the target block, where the longest-clock block pointed to by the target block is a legal block with a largest logical clock detected by the node when generating the target block; processing the package hash using a verifiable delay function to obtain a verifiable output result; determining the target sub-blockchain to which the target block belongs, a corresponding parent block in the target sub-blockchain, and a corresponding parent block hash and a parent block proof based on the verifiable output result; and obtaining the target block based on the other field information, the verifiable output result, the parent block hash, the parent block proof, and the transaction data.

Optionally, the matching module 1101 is further configured for: before merging other field information in fields of a block header of the target block excluding an auxiliary information field and hashing the merged data to obtain a package hash, taking a global snapshot of the plurality of sub-blockchains to obtain a latest valid block in each sequence of valid blocks; building a first Merkle tree corresponding to the global snapshot based on a block hash of each of the obtained latest valid blocks; and taking a root hash of the first Merkle tree as the global snapshot flag of the plurality of sub-blockchains.

Optionally, the matching module 1101 is further configured for: before merging other field information in fields of a block header of the target block excluding an auxiliary information field and hashing the merged data to obtain a package hash, building a second Merkle tree based on the transaction data; and taking a root hash of the second Merkle tree as the transaction root hash of the transaction data.

Optionally, the matching module 1101 is further configured for: before determining the target sub-blockchain to which the target block belongs, a corresponding parent block in the target sub-blockchain, and a corresponding parent block hash and a parent block proof based on the verifiable output result, encrypting and hashing the verifiable output result to obtain a verifiable output hash; and confirming that the verifiable output hash is less than a block generation difficulty.

Optionally, the matching module 1101 is specifically configured for: using the verifiable output hash to take a modulus of the total number of sub-blockchains to determine the target sub-blockchain to which the target block belongs; and taking a valid block corresponding to the target sub-blockchain in a global snapshot as the parent block of the target block in the target sub-blockchain, and obtaining the parent block hash and the parent block proof of the parent block.

Optionally, the verifiable output result includes verifiable output content and verifiable output proof, and the matching module 1101 is further configured for: after determining the target sub-blockchain to which the target block belongs, a corresponding parent block in the target sub-blockchain, and a corresponding parent block hash and a parent block proof based on the verifiable output result, generating a target block hash for the target block based on a block hash of the longest-clock block pointed to by the target block, the global snapshot flag, the transaction root hash, the verifiable output content, and the parent block hash.

Optionally, the matching module 1101 is further configured for: receiving the target block sent by the other nodes and obtaining, from a block header of the target block, a verifiable output result, a parent block hash of a parent block, a parent block proof of the parent block, and a global snapshot flag; performing a basic verification on the target block based on the obtained verifiable output result, the parent block hash, the parent block proof, and the global snapshot flag; performing a difficulty verification on the target block based on the verifiable output result of the target block; and performing a clock verification on the target block based on a logical clock of the target block and a logical clock of the parent block.

The screening module 1102 is specifically configured for: for each of the plurality of sub-blockchains, performing the following steps: starting from a genesis block of a sub-blockchain, extending along sub-block directions, successively selecting blocks each associated with a block subtree having a maximum weight as valid blocks until there is no extended block, to obtain a sequence of valid blocks comprising the selected valid blocks, where a block subtree for a block includes the block and other block subtrees extending along the block, and a weight of a block subtree is a sum of block weights of all blocks in the block subtree, where a block weight of each block is a verifiable output hash of the block or a predetermined ratio of the verifiable output hash.

Optionally, the screening module 1102 is specifically configured for: each time selecting a block associated with a block subtree having a maximum weight as a valid block, the following steps are performed: for a most recently selected first valid block in the sub-blockchain, determining, from the sub-blockchain, at least one candidate sub-block connected to the first valid block and a corresponding block subtree for each of the at least one candidate sub-block; determining a weight of a block subtree associated with each of the at least one candidate sub-block, and determining a maximum-weight block subtree based on the determined weight of each block subtree; and selecting, from the at least one candidate sub-block, a candidate sub-block corresponding to the maximum-weight block subtree as a second valid block.

Optionally, the ranking module 1103 is specifically configured for: obtaining a target valid block from each sequence of valid blocks; and globally ranking target valid blocks based on logical clocks of the target valid blocks to obtain the global blockchain.

Optionally, the screening module 1102 is further configured for: for each valid block, performing the following steps: when a weight of a block's block subtree is greater than or equal to a stable threshold, taking the block as a stable block; and when a weight of a block's block subtree is less than the stable threshold, taking the block as an unstable block.

Optionally, the ranking module 1103 is specifically configured for: obtaining a latest stable block from each sequence of valid blocks; obtaining a minimum logical clock from logical clocks of the obtained latest stable blocks, and using the minimum logical clock as a block clock boundary; selecting, from all stable blocks, target stable blocks whose logical clocks are less than or equal to the block clock boundary; and globally ranking the selected target stable blocks based on logical clocks of the selected target stable blocks to obtain the global blockchain.

Optionally, the ranking module 1103 is specifically configured for: globally ranking the selected target stable blocks in ascending order of logical clocks to obtain a preliminary ranking result; and when there are target stable blocks with an identical logical clock in the preliminary ranking result, ranking the target stable blocks with the identical logical clock based on sub-blockchain serial numbers or block hashes, to obtain the global blockchain.

In the embodiments of the disclosure, as the plurality of sub-blockchains may share the processing capacity of high-concurrency blocks in a large-scale network environment, adopting a multi-chain consensus approach to obtain a global blockchain may thus enhance the scalability and transaction throughput of the blockchain system in a large-scale open network environment. Secondly, the logical clock corresponding to each block provides a more reliable measure of temporal relationships between blocks. Thus, based on the logical clock for each valid block to globally rank the valid blocks to obtain a global blockchain may enhance the security of the multi-chain system and facilitate further optimizations of the multi-chain system based on the enhanced security.

Figure 12:
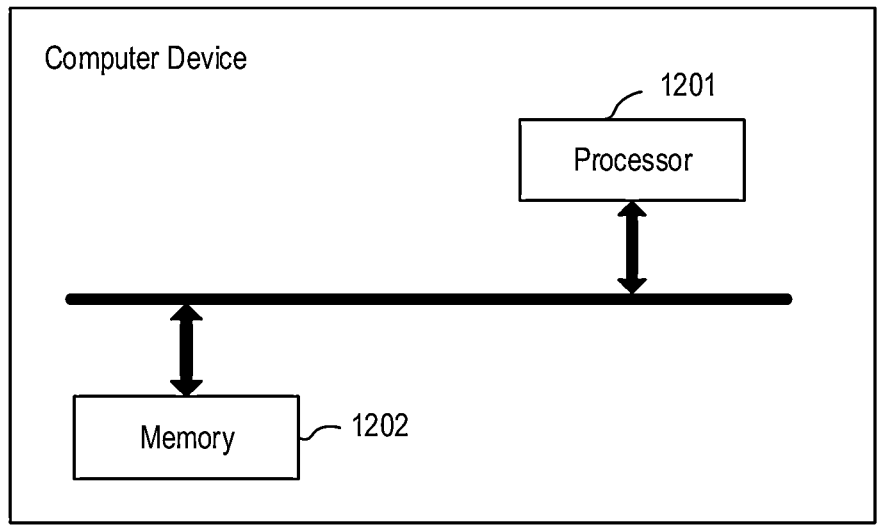
FIG. 12 illustrates a schematic diagram of a computer device, according to embodiments of the disclosure.

Based on similar technological concepts, embodiments of the disclosure provide a computer device. As shown in FIG. 12, the computer device includes at least one processor 701 and a memory 1202 coupled to the at least one processor. The specific connection medium between the processor 1201 and the memory 1202 is not limited in the embodiments of the disclosure. In the example in FIG. 12, the connection between the processor 1201 and the memory 1202 is illustrated as a bus connection. The bus may be a kind of address bus, data bus, control bus, etc.

In the embodiments of the disclosure, the memory 1202 stores instructions that may be executed by the at least one processor 1201. By executing the instructions stored in the memory 1202, the at least one processor 1201 may perform the steps included in the block consensus methods described above.

The at least one processor 1201 serves as the control center of the computer device, connecting various parts of the computer device through various interfaces and lines. By running or executing the instructions stored in the memory 1202 and calling the data stored in the memory 1202, the at least one processor 1201 may perform the blockchain consensus. Optionally, the processor 1201 may include one or more processing units, and the processor 1201 may integrate application processors and modem processors. The application processor mainly handles the operating system, user interface, and applications, while the modem processor mainly handles wireless communication. It is understood that the modem processor mentioned above may also be not integrated into the processor 1201. In some embodiments, the processor 1201 and the memory 1202 may be implemented on the same chip, and in some embodiments, the two may be implemented on separate chips.

Processor 1201 may be a general-purpose processor, such as a central processing unit (CPU), digital signal processor, Application Specific Integrated Circuit (ASIC), field-programmable gate array, or other programmable logic devices, discrete gates, or transistor logic devices, discrete hardware components, capable of implementing or executing the various methods, steps, and logic diagrams disclosed in the embodiments of the disclosure. A general-purpose processor may be a microprocessor or any conventional processor. The steps of the methods disclosed in the embodiments of the disclosure may be directly implemented by hardware processors or executed by a combination of hardware and software modules within the processors.

Memory 1202, as a non-volatile computer-readable storage medium, may be configured to store non-volatile software programs and non-volatile computer-executable programs and modules. Memory 1202 may include at least one type of storage medium, such as flash memory, hard disk, multimedia card, card-type storage, Random Access Memory (RAM), Static Random Access Memory (SRAM), Programmable Read Only Memory (PROM), Read-Only Memory (ROM), Electrically Erasable Programmable Read-Only Memory (EEPROM), magnetic storage, disk, optical disk, and the like. Memory 1202 is any medium capable of implementing functions including, but not limited to, carrying or storing desired program codes in the form of instructions or data structures that may be accessed by a computer. In the embodiments of the disclosure, memory 1202 may also be a circuit or any other device capable of implementing storage functions for storing program instructions and/or data.

Based on similar inventive concepts, the embodiments of the disclosure provide a computer-readable storage medium storing computer programs that may be executed by a computer device. When the programs run on a computer device, the computer device performs the steps of the blockchain consensus methods disclosed above.

Based on similar inventive concepts, the embodiments of the disclosure provide a computer program product, where the computer program product includes a computer program stored on a computer-readable storage medium. The computer program includes program instructions that, when executed by a computer, cause the computer to perform the steps of the blockchain consensus methods described above.

Those skilled in the art should understand that the embodiments of the present disclosure may be implemented as methods, systems, or computer program products. Therefore, the present disclosure may take the form of fully hardware implementations, fully software implementations, or a combination of software and hardware implementations. Moreover, the present disclosure may be implemented in the form of a computer program product on one or more computer-readable storage media (including but not limited to disk storage, CD-ROM, optical storage, etc.) containing computer-executable program code.

The embodiments of the present disclosure are described with reference to flowcharts and/or block diagrams illustrating the methods, devices (systems), and computer program products consistent with the present disclosure. It should be understood that each flow and/or block in the flowcharts and/or block diagrams, and combinations of flows and/or blocks in the flowcharts and/or block diagrams, may be implemented by computer program instructions. These computer program instructions may be provided to a general-purpose computer, a special-purpose computer, an embedded processor, or other programmable data processing devices to generate a machine, such that the instructions executed by the processor of the computer or other programmable data processing devices result in a device for implementing the functions specified in the one or more flowcharts and/or one or more block diagrams.

These computer program instructions may also be stored in a computer-readable memory that may boot a computer or other programmable data processing devices to work in a specific manner, such that the instructions stored in the computer-readable memory produce a device including instructions for implementing the functions specified in the one or more flowcharts and/or one or more block diagrams.

These computer program instructions may also be loaded onto a computer or other programmable data processing devices, to cause the computer or other programming data processing device to execute a series of operations to realize processing implemented by the computer, such that the instructions executed on the computer or other programmable data processing devices is configured for implementing the steps of functions specified in the one or more flowcharts and/or one or more block diagrams.

Although some embodiments of the disclosure have been described, those skilled in the art readily recognize that various changes and modifications may be made to these embodiments once they have knowledge of the basic inventive concepts. Accordingly, the appended claims are intended to include the preferred embodiments and all such changes and modifications that fall within the scope of the disclosure.

Clearly, those skilled in the art may make various changes and modifications to the present disclosure without departing from the spirit and scope of the disclosure. Thus, if these modifications and variations of the disclosure fall within the scope of the claims and equivalent techniques, the disclosure is also intended to include these modifications and variations.

What is claimed is:

1. A blockchain consensus method, applied to a node in a blockchain system, the method comprising:
   determining, from a plurality of sub-blockchains, a target sub-blockchain based on information in a block header of a target block, wherein the target block is a first target block generated by the node based on transaction data or a second target block obtained by synchronizing with other nodes;
   adding the target block to the target sub-blockchain;
   obtaining, from the plurality of sub-blockchains, a sequence of valid blocks for each of the plurality of sub-blockchains, wherein each sequence of valid blocks includes at least one valid block; and
   globally ranking the obtained valid blocks based on a logical clock corresponding to each of the obtained valid blocks, to obtain a global blockchain,
   wherein generating the first target block based on the transaction data comprises:
      merging other field information in fields of the block header of the first target block excluding an auxiliary information field to obtain merged data, and hashing the merged data to obtain a package hash, wherein the other field information includes at least a global snapshot flag of the plurality of sub-blockchains, a transaction root hash of the transaction data, and a block hash of a longest-clock block pointed to by the first target block, wherein the longest-clock block pointed to by the first target block is a legal block with a largest logical clock detected by the node when generating the first target block;
      processing the package hash using a verifiable delay function to obtain a verifiable output result;
      determining the target sub-blockchain to which the first target block to be added, a corresponding parent block in the target sub-blockchain, and a corresponding parent block hash and a parent block proof based on the verifiable output result; and
      obtaining the first target block based on the other field information, the verifiable output result, the parent block hash, the parent block proof, and the transaction data.

2. The method according to claim 1, wherein the logical clock of one of the valid blocks is the number of blocks passed along a logical clock path of the valid block, starting from the valid block until reaching a genesis block, wherein the logical clock path for the valid block is a path starting from that valid block, extending along directions towards longest-clock blocks until reaching the genesis block.

3. The method according to claim 1, wherein, before merging other field information in fields of the block header of the first target block excluding the auxiliary information field and hashing the merged data to obtain the package hash, the method further comprises:
- taking a global snapshot of the plurality of sub-blockchains to obtain a latest valid block in each sequence of valid blocks;
- building a first Merkle tree corresponding to the global snapshot based on a block hash of each of the obtained latest valid blocks; and
- taking a root hash of the first Merkle tree as the global snapshot flag of the plurality of sub-blockchains.

4. The method according to claim 1, wherein, before merging other field information in fields of the block header of the first target block excluding the auxiliary information field and hashing the merged data to obtain the package hash, the method further comprises:
- building a second Merkle tree based on the transaction data; and
- taking a root hash of the second Merkle tree as the transaction root hash of the transaction data.

5. The method according to claim 1, wherein, before determining the target sub-blockchain, a corresponding parent block in the target sub-blockchain, and a corresponding parent block hash and a parent block proof based on the verifiable output result, the method further comprises:
- encrypting and hashing the verifiable output result to obtain a verifiable output hash; and
- confirming that the verifiable output hash is less than a block generation difficulty, wherein the block generation difficulty is a fixed value or is adjusted periodically.

6. The method according to claim 5, wherein determining the target sub-blockchain, a corresponding parent block in the target sub-blockchain, and a corresponding parent block hash and a parent block proof based on the verifiable output result comprises:
- using the verifiable output hash to take a modulus of the total number of sub-blockchains to determine the target sub-blockchain; and
- taking a valid block corresponding to the target sub-blockchain in a global snapshot as the parent block of the first target block in the target sub-blockchain, and obtaining the parent block hash and the parent block proof of the parent block.

7. The method according to claim 1, wherein the verifiable output result includes verifiable output content and verifiable output proof; and
- after determining the target sub-blockchain, the corresponding parent block in the target sub-blockchain, and the corresponding parent block hash and the parent block proof based on the verifiable output result, the method further comprises:
  - generating a target block hash for the first target block based on the block hash of the longest-clock block pointed to by the first target block, the global snapshot flag, the transaction root hash, the verifiable output content, and the parent block hash.

8. The method according to claim 1, wherein obtaining the second target block by synchronizing with other nodes comprises:
- receiving the second target block sent by the other nodes and obtaining, from a block header of second the target block, a second verifiable output result, a second parent block hash of a second parent block, a second parent block proof of the second parent block, and a second global snapshot flag;
- performing a basic verification on the second target block based on the obtained second verifiable output result, the second parent block hash, the second parent block proof, and the second global snapshot flag;
- performing a difficulty verification on the second target block based on a comparison result between a block generation difficulty and the second verifiable output result of the second target block, wherein the block generation difficulty is a fixed value or is adjusted periodically; and
- performing a clock verification on the second target block based on a logical clock of the second target block and a logical clock of the second parent block.

9. The method according to claim 1, wherein obtaining, from the plurality of sub-blockchains, a sequence of valid blocks for each of the plurality of sub-blockchains comprises:
- for each of the plurality of sub-blockchains, performing the following steps:
  - starting from a genesis block of a sub-blockchain, extending along sub-block directions, successively selecting blocks each associated with a block subtree having a maximum weight as valid blocks until there is no extended block, to obtain a sequence of valid blocks comprising the selected valid blocks, wherein a block subtree for a block includes the block and other block subtrees extending along the block, and a weight of a block subtree is a sum of block weights of all blocks in the block subtree, wherein a block weight of each block is a verifiable output hash of the block or a predetermined ratio of the verifiable output hash.

10. The method according to claim 9, wherein each time selecting a block associated with a block subtree having a maximum weight as a valid block comprises:
- for a most recently selected first valid block in the sub-blockchain, determining, from the sub-blockchain, at least one candidate sub-block connected to the first valid block and a corresponding block subtree for each of the at least one candidate sub-block;
- determining a weight of a block subtree associated with each of the at least one candidate sub-block, and determining a maximum-weight block subtree based on the determined weight of each block subtree; and
- selecting, from the at least one candidate sub-block, a candidate sub-block corresponding to the maximum-weight block subtree as a second valid block.

11. The method according to claim 1, wherein globally ranking obtained valid blocks based on a logical clock corresponding to each of the obtained valid blocks, to obtain a global blockchain comprises:
- obtaining a target valid block from each sequence of valid blocks; and
- globally ranking target valid blocks based on logical clocks of the target valid blocks to obtain the global blockchain.

12. The method according to claim 1, further comprising:
- for each valid block, performing the following steps:
  - when a weight of a block's block subtree is greater than or equal to a stable threshold, taking the block as a stable block; and
  - when a weight of a block's block subtree is less than the stable threshold, taking the block as an unstable block.

13. The method according to claim 12, wherein globally ranking obtained valid blocks based on a logical clock corresponding to each of the obtained valid blocks, to obtain a global blockchain comprises:
- obtaining a latest stable block from each sequence of valid blocks;
- obtaining a minimum logical clock from logical clocks of the obtained latest stable blocks and using the minimum logical clock as a block clock boundary;
- selecting, from all stable blocks, target stable blocks whose logical clocks are less than or equal to the block clock boundary; and
- globally ranking the selected target stable blocks based on logical clocks of the selected target stable blocks to obtain the global blockchain.

14. The method according to claim 13, wherein globally ranking the selected target stable blocks based on logical clocks of the selected target stable blocks to obtain the global blockchain comprises:
- globally ranking the selected target stable blocks in ascending order of logical clocks to obtain a preliminary ranking result; and
- when there are target stable blocks with an identical logical clock in the preliminary ranking result, ranking the target stable blocks with the identical logical clock based on sub-blockchain serial numbers or block hashes, to obtain the global blockchain.

15. A computer device of a node, comprising a memory, a processor, and a computer program stored in the memory and executable on the processor, wherein the processor, when executing the program, implements operations including:
- determining, from a plurality of sub-blockchains, a target sub-blockchain based on information in a block header of a target block, wherein the target block is a first target block generated by the node based on transaction data or a second target block obtained by synchronizing with other nodes;
- adding the target block to the target sub-blockchain;
- obtaining, from the plurality of sub-blockchains, a sequence of valid blocks for each of the plurality of sub-blockchains, wherein each sequence of valid blocks includes at least one valid block; and
- globally ranking the obtained valid blocks based on a logical clock corresponding to each of the obtained valid blocks, to obtain a global blockchain,
- wherein generating the first target block based on the transaction data comprises:
  - merging other field information in fields of the block header of the first target block excluding an auxiliary information field to obtain merged data, and hashing the merged data to obtain a package hash, wherein the other field information includes at least a global snapshot flag of the plurality of sub-blockchains, a transaction root hash of the transaction data, and a block hash of a longest-clock block pointed to by the first target block, wherein the longest-clock block pointed to by the first target block is a legal block with a largest logical clock detected by the node when generating the first target block;
  - processing the package hash using a verifiable delay function to obtain a verifiable output result;
  - determining the target sub-blockchain to which the first target block to be added, a corresponding parent block in the target sub-blockchain, and a corresponding parent block hash and a parent block proof based on the verifiable output result; and
  - obtaining the first target block based on the other field information, the verifiable output result, the parent block hash, the parent block proof, and the transaction data.

16. A non-transitory computer-readable storage medium, storing a computer program executable on a computer device of a node, wherein the computer program, when executed on the computer device, causes the computer device to implement:
- determining, from a plurality of sub-blockchains, a target sub-blockchain based on information in a block header of a target block, wherein the target block is a first target block generated by the node based on transaction data or a second target block obtained by synchronizing with other nodes;
- adding the target block to the target sub-blockchain;
- obtaining, from the plurality of sub-blockchains, a sequence of valid blocks for each of the plurality of sub-blockchains, wherein each sequence of valid blocks includes at least one valid block; and
- globally ranking the obtained valid blocks based on a logical clock corresponding to each of the obtained valid blocks, to obtain a global blockchain,
- wherein generating the first target block based on the transaction data comprises:
  - merging other field information in fields of the block header of the first target block excluding an auxiliary information field to obtain merged data, and hashing the merged data to obtain a package hash, wherein the other field information includes at least a global snapshot flag of the plurality of sub-blockchains, a transaction root hash of the transaction data, and a block hash of a longest-clock block pointed to by the first target block, wherein the longest-clock block pointed to by the first target block is a legal block with a largest logical clock detected by the node when generating the first target block;
  - processing the package hash using a verifiable delay function to obtain a verifiable output result;
  - determining the target sub-blockchain to which the first target block to be added, a corresponding parent block in the target sub-blockchain, and a corresponding parent block hash and a parent block proof based on the verifiable output result; and
  - obtaining the first target block based on the other field information, the verifiable output result, the parent block hash, the parent block proof, and the transaction data.

* * * * *